Figure 5:
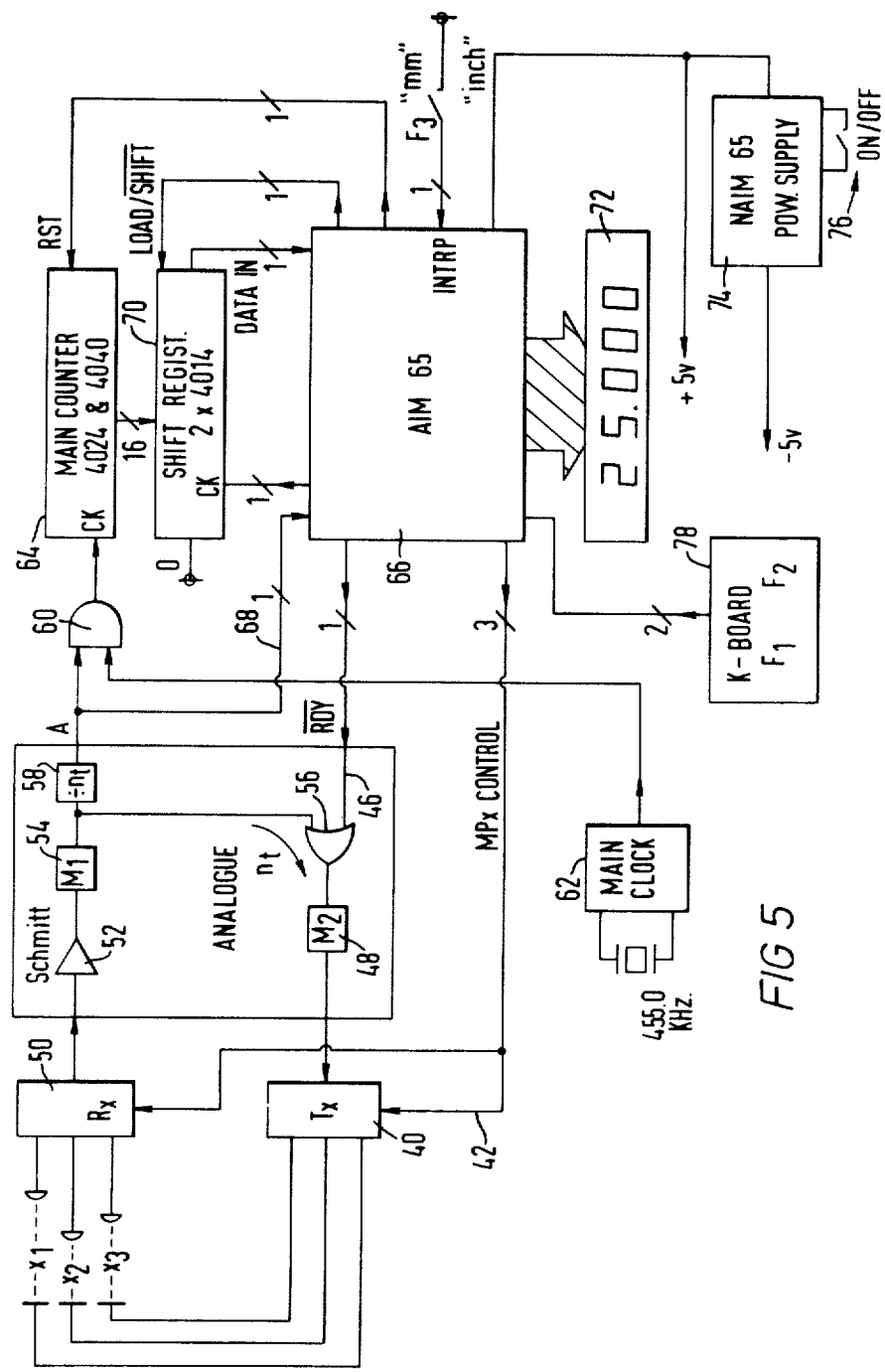

United States Patent [19]

Skrgatic et al.

[11] 4,388,708
[45] Jun. 14, 1983

[54] METHOD AND APPARATUS FOR DETERMINING PHYSICAL QUANTITIES

[76] Inventors: Damir M. J. Skrgatic, 203 Clement Rise, Dedridge, Livingston, West Lothian; John S. Strachan, 20 Gloucester La., Edinburgh EH3 6ED, both of Scotland

[21] Appl. No.: 244,962

[22] Filed: Mar. 18, 1981

[30] Foreign Application Priority Data

Mar. 20, 1980 [GB] United Kingdom ............... 8009495
Sep. 11, 1980 [GB] United Kingdom ............... 8029414

[51] Int. Cl.³ ................... G01B 17/00; G01S 15/10
[52] U.S. Cl. .................................. 367/2; 367/95; 367/108; 367/117; 367/902
[58] Field of Search .............. 367/2, 6, 95, 902, 108, 367/908, 117, 118, 127

[56] References Cited

U.S. PATENT DOCUMENTS

| | | | |
|---|---|---|---|
| 2,400,309 | 5/1946 | Kock | 367/95 X |
| 2,568,926 | 9/1951 | Moran, Jr. | 367/2 X |
| 3,076,519 | 2/1963 | Alsabrook | 367/2 |
| 3,100,885 | 8/1963 | Welkowitz et al. | 367/908 X |
| 3,115,615 | 12/1963 | Saper | 367/902 X |
| 3,503,680 | 3/1970 | Schenkerman | 367/95 X |

*Primary Examiner*—Richard A. Farley
*Attorney, Agent, or Firm*—Gerald J. Ferguson, Jr.; Joseph J. Baker

[57] ABSTRACT

A distance R to be measured is derived by measuring the spacing $x_m$ between a fixed transmitter Tx and a movable receiver Rx, and comparing this with the reference spacing $x_{ref}$ between a fixed transmitter Tx' and receiver Rx. Each spacing is measured by passing a large number of pulses sequentially from receiver to transmitter through a coupling medium, the receipt of one pulse triggering transmission of the next. The spacing is derived from the time T taken to pass n pulses; preferably n is fixed and T is measured.

6 Claims, 6 Drawing Figures

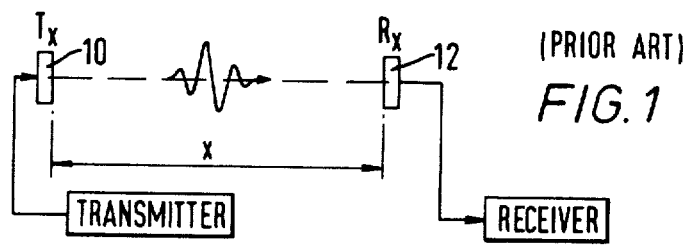
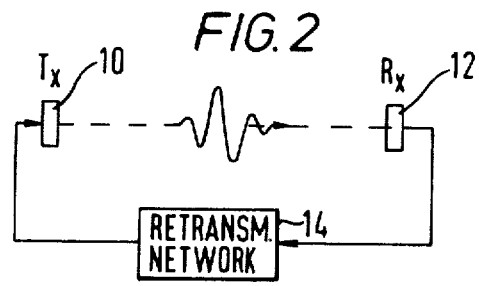
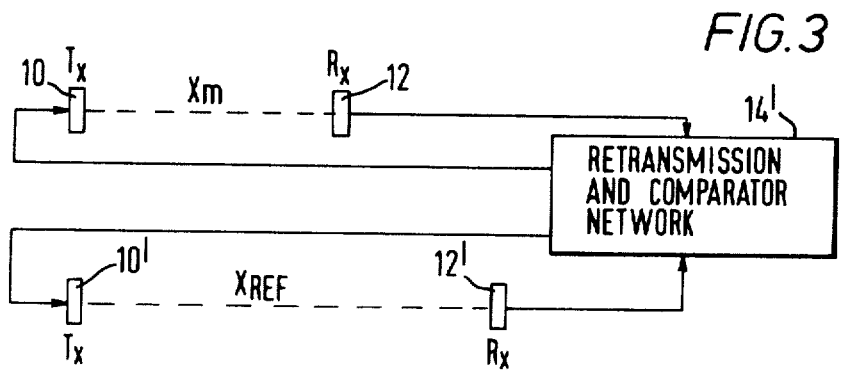
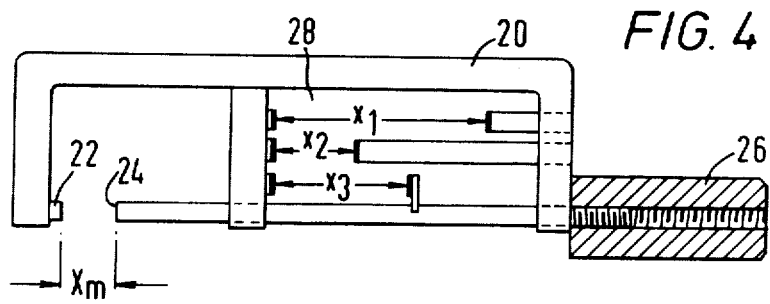

METHOD AND APPARATUS FOR DETERMINING PHYSICAL QUANTITIES

This invention relates to the monitoring length and other physical quantities, for example a distance between two locations which are movable relative to one another, and is applicable inter alia to machine tools and micrometers.

It is known to measure the position of a moving part of a machine tool by counting moiré fringes produced by a stationery and a moving diffraction grating. This method can provide a very high resolution, but is extremely expensive owing to the cost of producing the gratings, and is subject to impairment by grease and dirt.

It has also been proposed to use ultrasonic techniques to effect such measurements. In British patent specification No. 889,436 there is proposed a distance measuring arrangement which makes use of the time delay of a periodic phenomenon launched along a guide; the phenomenon may be an acoustic wave and the guide a column of liquid. British patent specification No. 1,525,720 proposes the use of a reflected ultrasonic pulse to measure the displacement of a hydraulic ram. These prior proposals suffer from the disadvantage that the accuracy of measurement depends on accuracy in measuring a transit time which is extremely short, and this leads to a low resolution.

One object of the present invention is to provide a length measuring apparatus and method which is relatively cheap to manufacture while providing a high degree of accuracy.

Another object of the invention is to apply a similar technique to the monitoring of other parameters such as flow rate and temperature.

Accordingly, one aspect of the invention provides a method of determining a physical parameter, comprising:
 (a) emitting a pulse of wave energy through a fluid medium from a first location,
 (b) detecting the pulse at a second location,
 (c) causing a further pulse to be emitted in response to said detection,
 (d) repeating steps (b) and (c) until n pulses have passed through the medium in a known time T, and
 (e) deriving said parameter from the values of n and T.

From another aspect, the invention provides apparatus for determining a physical parameter, comprising:
 a pulse transmitter at a first location,
 a pulse receiver at a second location which in use is separated from the first location by a transmission path through a fluid medium,
 retransmission means responsive to receipt of a pulse by the receiver to cause transmission of a further pulse by the transmitter,
 counting means connected to the receiver to count the number n of pulses received,
 timing means for determining the time T required to receive said number of pulses received, and
 calculating means arranged to derive said parameter from n and T.

It is also desirable to obviate or greatly reduce the effects of temperature, ageing and drift on measurements. To this end, in a particularly preferred form of the invention three pairs of ultrasonic transducers are used with spacings of $x_1, x_2$, and $x_3$ and the variable distance R between the transducers $x_3$ is derived from $$R = \frac{x_3 - x_2}{x_1 - x_2}$$

It is also preferred to use common electronic circuitry in a time sequential multiplex mode. These techniques automatically compensate for the above effects.

Figure 6:
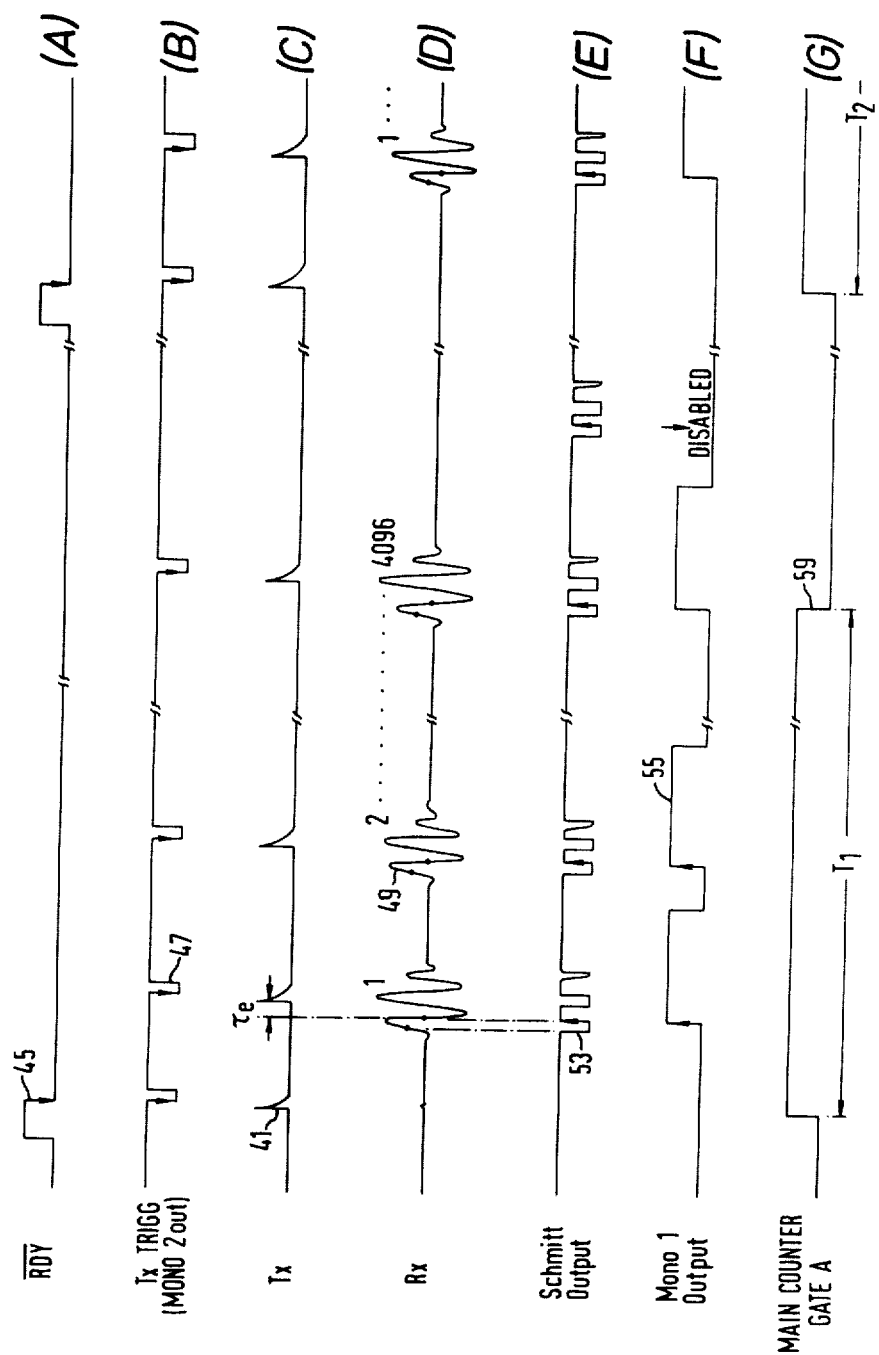

Embodiments of the present invention will now be described, by way of example, with reference to the accompanying drawings, in which:

FIG. 1 illustrates the operation of prior art devices;
FIG. 2 illustrates the principle of the present invention;
FIG. 3 illustrates a more refined form of the invention with temperature compensation;
FIG. 4 is a schematic cross-sectional elevantion of a micrometer incorporating the invention;
FIG. 5 is a block diagram of the electronic circuits used in the micrometer of FIG. 4 and
FIG. 6 illustrates various waveforms in the circuits of FIG. 5.

Referring to FIG. 1, which illustrates the prior art, a transmitting crystal 10 and a receiving crystal 12 are separated by a fluid medium (not shown) which may be water or light oil. An ultrasonic pulse is emitted into the fluid, and the distance x between the crystals 10 and 12 is measured from the relationship $$t = \frac{x}{c} + \tau_e \quad (1)$$

where t is the transit time, c is the speed of sound and $\tau_e$ is the response time of the electronics. The value of x can thus be derived from measurement of t. The resolution achieved is dependent on the sound wavelength and the response time $\tau_e$; practical constraints on the electronics and acoustics limit the resolution to about 1 mm, or perhaps down to 0.1 mm with more advanced and therefore expensive hardware.

Turning to FIG. 2, the present invention also makes use of ultrasonic pulses transmitted through a fluid medium (not shown) between a transmitting crystal 10 and a receiving crystal 12. However, a retransmitting network 14 is provided whereby the receipt of a pulse triggers the transmission of a further pulse. This is in effect an averaging process, since the electronic delay $\tau_e$ and the acoustic delay x/c have a random noise component added to them and these components, being random mostly cancel out. The resulting relationship is defined by:

$$T = t \cdot n_t = \left(\frac{x}{c} + \tau_e\right) \cdot n_t \quad (2)$$

where T is the accumulated time interval and $n_t$ is the number of retransmissions. Thus x can be determined by measuring T for a given $n_t$ (or vice versa). The resolution which can be achieved in practice with quite ordinary hardware is of the order of a fraction of a micron.

The accuracy of the method outlined in FIG. 2 is still limited by two factors:
 (a) The speed of sound c varies with temperature and age of the fluid medium, and (b) $\tau_e$ is also a function of temperature and can vary over extended periods.

These inaccuracies can be reduced by the system shown in FIG. 3 wherein the distance $x_m$ to be measured is between a transmitting crystal 10 and receiving crystal 12 operating as in FIG. 2, one of the crystals 10,12 being movable relative to the other. A reference loop is provided by a fixed transmitting crystal 10' and fixed receiving crystal 12' separated by a distance $x_{ref}$ in the same fluid medium. The two sets of crystals are driven by a common retransmission network 14' which also comprises a comparator. The comparator produces a result $$R = x_m/x_{ref}$$

which, since $x_{ref}$ is accurately known, gives an accurate value of the distance to be measured independently of temperature and ageing effects. This is discussed in detail below for the preferred embodiment.

FIG. 4 illustrates the mechanical arrangement of a preferred embodiment of the invention in the form of a micrometer. A frame 20 carries a fixed anvil 22 and a movable jaw 24, the distance between these being the distance $x_m$ to be measured. The jaw 24 can be adjusted by screw 26. The frame 10 also forms a cavity 28 which is filled with a fluid medium, preferably light oil. Three pairs of ultrasonic transducers provide three acoustic paths in the fluid of lengths $x_1, x_2$ and $x_3$. One of the $x_3$ transducers is secured to movable jaw 24 so that $x_3$ varies with $x_m$, and the arrangement is such that when $x_m = 0$, $x_3 = x_2$. Thus:

$$x_m = x_3 - x_2 \tag{4}$$

and $$x_{ref} = x_1 - x_2 \tag{5}$$

The principle of operation is as follows. Three time intervals:

$$T_1 = \left(\frac{x_1}{c} + \tau_e\right) \cdot n_t$$

$$T_2 = \left(\frac{x_2}{c} + \tau_e\right) \cdot n_t$$

$$T_3 = \left(\frac{x_3}{c} + \tau_e\right) \cdot n_t$$

are measured, and each time interval is expressed as the number of clock pulses $N_1, N_2, N_3$ counted in a counter during the intervals $T_1, T_2, T_3$. The numbers $N_1, N_2, N_3$ are then manipulated to give the result R as follows.

$$\left[\frac{N_3 - N_2}{N_1 - N_2} - \frac{N_3^0 - N_2^0}{N_1^0 - N_2^0}\right] \cdot K = R \tag{6}$$

where $N_1^0, N_2^0, N_3^0$ are obtained with the micrometer zeroed, and K is a scale factor. The term $$\frac{N_3^0 - N_2^0}{N_1^0 - N_2^0} = N_0$$

is constant for a given micrometer and is stored in a continuous memory. The scale factor K can be determined by inserting a standard test piece in the micrometer, e.g. by inserting a test piece 25,000 μm thick $$K = 25000 \cdot \frac{1}{\frac{N_3^{25} - N_2^{25}}{N_1^{25} - N_2^{25}} - N_0} \tag{7}$$

and this result is also stored in the memory.

It is seen that the term $(N_3 - N_2)/(N_1 - N_2)$ is independent of variations in c and $\tau_e$, since this term equals $$\frac{\left(\frac{x_3}{c} + \tau_e\right) \cdot n_t \cdot f - \left(\frac{x_2}{c} + \tau_e\right) \cdot n_t \cdot f}{\left(\frac{x_1}{c} + \tau_e\right) \cdot n_t \cdot f - \left(\frac{x_2}{c} + \tau_e\right) \cdot n_t \cdot f} = \frac{x_3 - x_2}{x_1 - x_2}$$

where f is the clock frequency.

FIG. 5 illustrates a suitable electronic system for the micrometer, the relevant waveforms being shown in FIG. 6. The basic operation is that the times $T_1, T_2, T_3$ to count $2^{12}$ pulses are measured sequentially, and R is calculated according to equation (7) above.

A transmitter 40 is connected to drive one of three transmitting crystals in accordance with a multiplex control signal on line 42, and a receiver 44 is connected to one of three receiving crystals in dependence on the same multiplex control signal. Operation is started by a "ready" signal $\overline{RDY}$ 45 (FIG. 6A) on line 46 which triggers monostable 48 to produce a transmitter trigger signal 47 (FIG. 6B). Transmitter 40 produces a driving signal 41 (FIG. 6C) which excites the transmitting crystal to emit an ultrasonic pulse, which passes through the fluid and produces a signal 49 (FIG. 6D) from a receiver 50. The receiver signal 49 is level-detected by a Schmitt trigger 52 whose output 53 (FIG. 6E) triggers a monostable 54 to produce uniform pulses 55 (FIG. 6F). Each pulse 55 passes via OR-gate 56 to trigger the monostable 48 and thus initiate a re-transmission of the acoustic pulse.

The pulses 55 are also applied to a division circuit 58 in which division by 4096 is effected. The output 59 (FIG. 6G) or division circuit 58 is connected to AND gate 60 to enable clock pulses from a 455 kHz clock circuit 62 to pass to a counter 64. Thus the count held by the counter 64 after 4096 acoustic pulse transits across the length x, is the number $N_1$.

The same process is then repeated sequentially to obtain $N_2$ and $N_3$.

The computation of R is suitably carried out in a microprocessor, in this example a Rockwell type "AIM 65" microprocessor 66. After $n_t$ pulses have been received, the output of division circuit 58 is supplied on line 68 as an input to the microprocessor 66, and causes the count N held in the counter 64 to be input into the microprocessor 66 via a shift register 70, the counter 64 reset, and the multiplex control signal on line 42 advanced. After computation, the result R is displayed on any suitable display as indicated at 72.

It will be understood that the required computation can easily be carried out in any suitable programmed processor or hard-wired circuitry. Many such ways of carrying out the computation detailed above will be apparent to those skilled in the art, and will therefore not be described in detail.

The embodiment of FIG. 5 also includes a conventional power supply 74 provided with on/off switch 76. Switch $F_3$ when closed provides a readout in inch units by switching in a circuit or program instruction to divide the result R by 2.54.

A keyboard 78 provides keys $F_1, F_2$ for use when calibrating the instrument. The micrometer is closed and key $F_1$ depressed. The resulting value of $N_o$ is stored in the microprocessor memory. The same procedure, using key $F_2$, is carried out with a known test piece to derive the scale factor K, which is also stored in memory. Since this procedure need be carried out only once to calibrate the instrument, the keyboard 78 may be temporarily plugged in during manufacture and not form part of the instrument in normal use.

It will thus be seen that the above embodiment provides a highly accurate micrometer which is essentially immune to temperature, ageing and drift. It also provides a very high resolution (typically about 1 μm) while using only relatively simple and cheap components.

The above embodiment can be applied with very minor modification to other measurement tasks. For example, the ultrasonic transducers may be located in an oil-filled tube secured to a machine tool, the movable transducer being mechanically coupled to a moving part of the machine tool.

Other modifications are possible within the scope of the invention. For example, the transmitting and receiving transducers can be located adjacent each other and the pulses reflected from transmitter to receiver by a movable reflector; obviously in this case it is necessary to disable the receiver briefly at the time of transmission, and to allow for the acoustic path being twice the distance of interest.

The invention may also be applied to the measurement of parameters other than length.

Weight may be measured by use of a spring or other resilient member of known load/displacement characteristic, the displacement of the spring under load being measured to calculate the weight.

The flow rate of a liquid in a conduit may be measured by positioning fixed transmitters and receivers in the conduit. The time T in the conduit will be greater (or lesser) than a reference value in dependence on flow rate since the effective speed of sound c will be greater with increasing flow rate in the direction of transmission.

Further, since the speed of sounc c varies with temperature, the temperature of a liquid can be measured by providing acoustic paths of known length in the liquid of interest; the effect will be apparent from an examination of varying c in equation (2) above.

Although described with reference to ultrasonic pulses, pulses of other wave energy may be used, e.g. laser light.

We claim:

1. Apparatus for determining a physical parameter, comprising:
    a first pulse transmitter transducer and a first pulse receiver transducer separated by a transmission path through a fluid medium,
    retransmission means, responsive to receipt of a pulse by the first receiver transducer, for causing transmission of a further pulse by the first transmitter transducer,
    counting means, connected to the first receiver transducer, for counting the number n of pulses received,
    timing means for determining the time T required to receive said number n of pulses received,
    calculating means arranged to derive a measured value of said physical parameter from n and T, and
    reference means, including a second transmitter transducer and a second receiver transducer at fixed locations operating in conjunction with said retransmission, counting and timing means, for providing reference values of the time required for transmission of a number of pulses between said fixed locations which reference values vary with environmental changes in the transmission medium and operational drift in the retransmission, counting and timing means,
    said calculating means including means for comparing n, T and said reference values of time and the number of pulses and for adjusting said measured values of said physical parameter accordingly.

2. The apparatus of claim 1, in which each pulse transmitter comprises an ultrasonic transducer and each pulse receiver comprises another ultrasonic transducer.

3. The apparatus of claim 2, in which the transducers of the first transmitter and receiver are movable relative to each other, and the parameter to be measured is the acoustic path length between the two.

4. The apparatus of claim 3, further including a third transmitter and third receiver at fixed locations, the calculating means being operative to derive the distance R to be measured from the ratio $$R = \frac{x_3 - x_2}{x_1 - x_2}$$

where $x_3$ is the spacing between the first-mentioned transmitter and receiver, $x_2$ is the spacing between the second transmitter and receiver, and $x_1$ is the spacing between the third transmitter and receiver.

5. The apparatus of claim 4, in which common transmitter and receiver circuits are connected to the transmitter/receiver transducer pairs in time sequential multiplex.

6. The apparatus of any of claim 3, claim 4 or claim 5, in which the variable time T for passage of a fixed number n of pulses is measured, the apparatus including a divide-by-n circuit connected to receive the output of the receiver and to control a gate, and a clock circuit whose output passes via the gate to a counter, whereby the count held by the counter after n pulses have passed is a measure of the time T.

* * * * *